United States Patent Office 3,012,058
Patented Dec. 5, 1961

3,012,058
NITRILE COMPOUNDS
Murray Hauptschein, Glenside, Pa., assignor to Pennsalt Chemicals Corporation, Philadelphia, Pa., a corporation of Pennsylvania
No Drawing. Filed May 15, 1958, Ser. No. 735,648
3 Claims. (Cl. 260—465)

This invention relates to para-substituted 2-trifluoromethylbenzonitriles represented by the formula

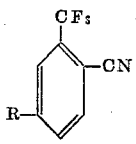

wherein R includes chlorine, amino and hydroxyl radicals. Particularly this invention relates to the compounds 4-chloro-2-trifluoromethylbenzonitrile (I), 4-amino-2-trifluoromethylbenzonitrile (II) and more particularly to 4-hydroxy-2-trifluoromethylbenzonitrile (III) having formulas as shown in Table I.

TABLE I

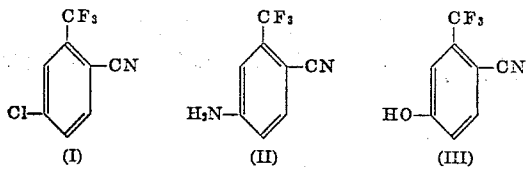

(I)  (II)  (III)

The compounds of this invention are useful as pesticides and as chemical intermediates for the preparation of dyes and synthetic resins.

This application is a continuation-in-part of Serial No. 447,390, filed August 2, 1954, now abandoned.

The principal product of this invention, 4-hydroxy-2-trifluoromethylbenzonitrile, is prepared from known starting materials. It is preferably prepared by diazotization followed by cyanation of 4-amino-3-trifluoromethylphenol:

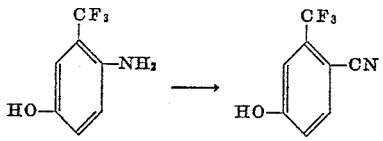

4-hydroxy-2-trifluoromethylbenzonitrile is also prepared from 4-chloro-2-trifluoromethylaniline by the steps of diazotization followed by cyanation to 4-chloro-2-trifluoromethylbenzonitrile, amination to 4-amino-2-trifluoromethylbenzonitrile and diazotization of the latter compound and replacement of the amino group by hydroxyl to form said 4-hydroxy-2-trifluoromethylbenzonitrile, as shown in the following equations:

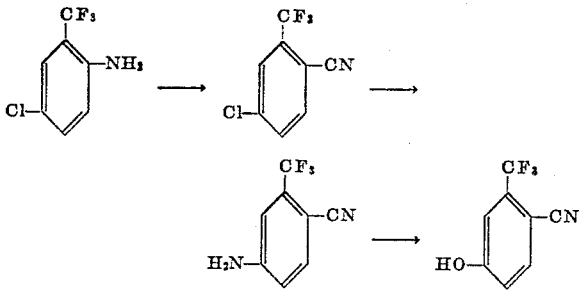

The intermediate compounds, 4-chloro-2-trifluoromethylbenzonitrile and 4-amino-2-trifluoromethylbenzonitrile, are also novel compounds.

The preparation of 4-hydroxy-2-trifluoromethylbenzonitrile is demonstrated in the following examples which are presented for the purpose of illustrating the invention. It is to be understood that the invention is not intended to be restricted to these examples.

Example 1

4-HYDROXY-2-TRIFLUOROMETHYLBENZONITRILE

Two grams of 4-amino-3-trifluoromethylphenol were dissolved in a solution of 8 ml. of concentrated sulfuric acid and 6 ml. of water and then diazotized at 0° C. with a solution of 0.8 g. of sodium nitrite in 5 ml. of water. The cold diazonium solution was treated with potassium nickelocyanide by Sandemeyer procedure. The black precipitate (1.6 g.) was dissolved in hot water, decolorized with charcoal, and filtered. The filtrate was cooled in an ice-bath and 0.63 g. (30%) of fine white needles of 4-hydroxy-2-trifluoromethylbenzonitrile, M.P. 119–120° C. was collected.

Anal.—Calcd. for $C_8H_4ONF_3$: C, 51.35; H, 2.15; N, 7.49. Found: C, 51.51; H, 2.30; N, 7.46.

Another method of preparation is as follows:

Example 2

4-CHLORO-2-TRIFLUOROMETHYLBENZONITRILE

To 78.2 g. (0.4 mole) of 4-chloro-2-trifluoromethylaniline, B.P. 84° C. at 10 mm., in 133 ml. of cold concentrated sulfuric acid, a cold 20% solution of sodium nitrite (27.6 g.) was added gradually with vigorous shaking. The diazonium solution was then added to potassium nickelocyanide as described above. On steam distillation, 34.46 g. (42%) of 4-chloro-2-trifluoromethylbenzonitrile was collected, essentially all of which boiled at 109° C. at 10 mm. $n_D^{26}$ 1.4902.

Anal.—Calcd. for $C_8H_3NClF_3$: C, 46.74; H, 1.47; N, 6.81. Found: C, 47.26; H, 1.74; N, 6.45.

Example 3

4-AMINO-2-TRIFLUOROMETHYLBENZONITRILE 4-chloro-2-trifluoromethylbenzonitrile prepared according to Example 2, aminated with an excess of liquid ammonia in a stainless steel pressure reactor at 130° C. There was isolated in ca. 50% yield 4-amino-2-trifluoromethylbenzonitrile, M.P. 142° C. (recrystallized from water).

Anal.—Calcd. for $C_8H_5N_2F_3$: C, 51.62; H, 2.71. Found: C, 52.07; N, 3.15.

Example 4

4-HYDROXY-2-TRIFLUOROMETHYLBENZONITRILE

Ninety-three hundredths gram (0.005 mole) of 4-amino-2-trifluoromethylbenzonitrile prepared according to Example 3 was diazotized in a solution of 10 ml. of concentrated sulfuric acid and 20 ml. of water with 0.35 g. of sodium nitrite in 5 ml. of water. The diazonium solution was added in portions to a refluxing solution of 5 ml. of concentrated sulfuric acid and 40 ml. of water. The solution was refluxed for ¾ hour, cooled in ice, and 0.79 g. of crude material was recovered after separation of a red dye was made mechanically. On recrystallization from hot water (decolorized with charcoal) 0.6 g. (64%) of pure white 4-hydroxy-2-trifluoromethylbenzonitrile, M.P. 119–112° C. was recovered.

4-hydroxy-2-trifluoromethylbenzonitrile is particularly useful as a pesticide for warm-blooded pests, especially rats. In this service the compound is highly toxic, more so than is benzonitrile, due to the presence of the trifluoromethyl group in addition to the cyano group in the molecule. Furthermore, the compound is a water-soluble crystalline product which is practically odorless. These properties are advantageous in the preparation and distribution of 4-hydroxy-2-trifluoromethylbenzonitrile as a rodenticide in baits.

The use of 4-hydroxy-2-trifluoromethylbenzonitrile as a rodenticide in a rat bait is demonstrated by the following example.

Example 5

An aqueous solution containing about 0.75 lb. of 4-hydroxy-2-trifluoromethylbenzonitrile per quart of water is prepared and used as a rodenticide in the following bait for Norway rats:

| Ingredient | Amount |
|---|---|
| Fresh ground pork back fat | lbs__ 20 |
| Ground white bread crumbs | lbs__ 40 |
| Breakfast rolled oats | lbs__ 40 |
| Fish oil | qt__ 1 |
| 4-hydroxy-2-trifluoromethylbenzonitrile solution | qt__ 1 |

In preparing the above bait, the solution of 4-hydroxy-2-trifluoromethylbenzonitrile is mixed into the bread crumbs and rolled oats. The mixture is allowed to dry. The dried mixture is then blended with the other ingredients.

The mixed bait is distributed in areas infested by rats, care being taken that other animals, e.g., cats and dogs, do not have ready access to the bait. Upon ingestion of the bait, the 4-hydroxy-2-trifluoromethylbenzonitrile is absorbed into the blood stream, where the effect is toxic, resulting in the death of the rat.

The intermediary compounds of this invention, 4-chloro-2-trifluoromethylbenzonitrile and 4-amino-2-trifluoromethylbenzonitrile are also useful as pesticides for warm-blooded pests and can be used, in the same way as 4-hydroxy-2-trifluoromethylbenzonitrile, as a rodenticide by substituting them for the latter compound in the bait disclosed in Example 5.

Many different embodiments of this invention may be made without departing from the spirit and scope of it, and it is to be understood that my invention includes also such embodiments and is not limited by the above description.

I claim:

1. The method of preparing 4-hydroxy-2-trifluoromethylbenzonitrile which comprises the steps of diazotizing followed by cyanation of 4-chloro-2-trifluoromethylaniline to 4-chloro-2-trifluoromethylbenzonitrile, aminating the latter compound to 4-amino-2-trifluoromethylbenzonitrile and diazotizing and then hydroxylating this latter compound to form said 4-hydroxy-2-trifluoromethylbenzonitrile.

2. The compound 4-hydroxy-2-trifluoromethylbenzonitrile.

3. The compound 4-amino-2-trifluoromethylbenzonitrile.

References Cited in the file of this patent

UNITED STATES PATENTS

| | | |
|---|---|---|
| 2,195,076 | Braun et al. | Mar. 26, 1940 |

FOREIGN PATENTS

| | | |
|---|---|---|
| 756,079 | Great Britain | Aug. 29, 1956 |
| 757,361 | Great Britain | Sept. 19, 1956 |

OTHER REFERENCES

Hauptschein et al.: J.A.C.S., vol. 76, Feb. 1954, pages 1051–1054.